United States Patent [19]
Juergens

[11] Patent Number: 5,198,313
[45] Date of Patent: Mar. 30, 1993

[54] BATTERY END CONNECTOR

[75] Inventor: Tristan E. Juergens, Black Hawk, Colo.

[73] Assignee: Bolder Battery, Inc., Wheatridge, Colo.

[21] Appl. No.: 757,447

[22] Filed: Sep. 10, 1991

Related U.S. Application Data

[63] Continuation-in-part of Ser. No. 366,867, Jun. 14, 1989, Pat. No. 5,047,300.

[51] Int. Cl.⁵ .............................................. H01M 2/28
[52] U.S. Cl. ...................................... 429/94; 429/161; 29/623.5
[58] Field of Search .................... 429/94, 161, 211; 427/123, 436; 29/623.5

[56] References Cited

U.S. PATENT DOCUMENTS

| | | | |
|---|---|---|---|
| 3,764,386 | 10/1973 | Mix | 429/161 |
| 4,399,607 | 8/1983 | May | 29/623.5 |
| 4,683,180 | 7/1987 | Bish et al. | 429/161 X |
| 5,045,086 | 9/1991 | Juergens | 29/623.1 |

Primary Examiner—Stephen Kalafut
Attorney, Agent, or Firm—Beaton & Swanson

[57] ABSTRACT

An end connector for a battery in which a set of interleafing battery plates is electrically and mechanically connected with a cast-on element to form a secure attachment with no discontinuities. The preferred embodiment utilizes a set of lead or lead alloy plates having an edge that is immersed into a mold of molten material that forms the end connector.

41 Claims, 2 Drawing Sheets

BATTERY END CONNECTOR

CROSS-REFERENCE TO RELATED APPLICATIONS

This is a continuation-in-part of application No. 07/366,867 filed Jun. 14, 1989, now issued as U.S. Pat. No. 5,047,300.

FILED OF INVENTION

The present invention relates to an end connector for electrically and mechanically connecting the ends of a set of battery plates to the battery terminal, a battery constructed with such end connectors, and a method of making the same.

BACKGROUND OF THE INVENTION

Batteries typically are constructed with a set of anode plates and a set of interleafing cathode plates, which are spaced apart by separators infused with an electrolyte. The anode plates must be electrically connected to the battery anode terminal, and the cathode plates must be electrically connected to the battery cathode terminal. For the sake of rigidity of the assembled sets of anode and cathode plates, the connection between the plates and the terminals is typically mechanical as well as electrical, and is accomplished with an "end connector" of some type.

This electromechanical attachment of the anode and cathode plates to their respective terminals through end connectors is one of the more labor intensive and fault intensive aspects of battery construction. Ideally, the end connector assembly would rigidly support the plates to help prevent their deformation within the battery case and to resist vibrational damage to the plates and separators. Further, the end connectors should be formed of a material that is readily connectable to both the terminal and to the plates in a manner that assures an easy and dependable electrical and mechanical attachment. It is particularly important that the electrical connection to both the plates and the terminal be of the lowest possible resistance, or at least of a resistance no greater than the resistance in the plates and terminals themselves, so that the impedance of the connection is minimized and the current capacity is maximized.

These goals become extremely important in a battery with extremely thin plates, as described in U.S. Pat. No. 5,047,300, of which this application is a continuation-in-part, and U.S. Pat. No. 5,045,086. Briefly, those applications disclose a rechargeable battery with a mechanical design characterized by very thin anode and cathode plates that may be spirally wound with a electrolyte pasted separator. The resulting wound battery generally has little structural strength and therefore requires extra support from the battery casing. Further, the very thin plates and separators result in a very large number of plates at each end. The large number of plates requires a proportionately large number of labor intensive and failure prone connectors, in comparison to batteries having thicker plates and separators.

The dominant electrical characteristic of the batteries described in the above-mentioned applications is a very high charge and discharge rate. This high charge and discharge rate requires high current carrying capacity in the electrical connection from the plates to the terminals, in order to both carry the load without reducing the charge and discharge rate and also to avoid resistive overheating that could structurally or electrically damage the battery.

The prior art discloses many types of end connectors that are designed to enhance the structural integrity or to minimize the electrical impedance of batteries. For example, U.S. Pat. No. 4,539,273 by Goebel describes a set of plates wound on a spool with an anode flange and a cathode flange. Each plate has a set of connecting tabs spaced along an edge, which is in electrical contact with the appropriate spool flange. The Goebel device does not provide for any secure mechanical connection between the spool flange and the plates. Also, the Goebel device would appear to require a fairly intricate manufacturing process, especially if used on a very thin plate battery having a very long plate edge that would require a large number of connecting tabs.

In U.S. Pat. No. 3,695,935 by Cromer, there is disclosed a spirally wound plate design where the anode plate is wound offset from the cathode plate so that the anode plate edge overhangs one edge of the spiral and the cathode plate edge overhangs the other edge of the spiral. The two overhanging edges are "ruffled". The purpose of the ruffles is said to be to strengthen the edges against damage during manufacturing, to blunt the edges to reduce the potential for injuring manufacturing workmen, and to increase the ohmic contact between the plate and the terminal. The Cromer device still uses an ordinary strap type end connector to join the plates to the terminal.

One of the more common arrangements for electrically connecting the plates to the terminals is shown in U.S. Pat. No. 3,862,861 by McClelland et al. In the McClelland arrangement, the plates include spaced tabs on the plate edge so that the wound plate has a set of tabs protruding from an end. The protruding tabs are then joined together and connected to the terminal. The McClelland arrangement has the problems of difficulty in construction and increased impedance that are typical of the prior art.

SUMMARY OF THE INVENTION

The present invention includes a design in which the anode plates are stacked or wound offset from the cathode plates with a separator between the two, so that one edge of the stacked or wound system has a set of protruding anode plates and the other edge has a set of protruding cathode plates. The protruding plates are connected to an end connector by casting a disk shaped end connector in-place onto the protruding plates, and attaching the cast end connector to the terminal. By controlling the casting temperatures and other parameters, the end connector will solidify to form an integral unit with the plates, and the resulting connection will have a continuous crystal structure with no electrical, mechanical or metallurgical discontinuities.

The resulting design has an end connector which supports the plates through their entire edge rather than merely supporting the plates at only discrete tabbed portions. This lends excellent structural strength and vibration resistance to the battery. The lack of any electrical, mechanical or metallurgical discontinuities assures that the connection will not deteriorate and that there will be no resistance at the points of connection. The connection through the entire plate edge avoids any reduction in the cross-sectional area in the current path, and thereby avoids the additional impedance caused by channelling the current through small cross section tabs. It also provides the shortest possible route of travel for the current into and out of the battery. Finally, the cast end connector can be easily soldered or welded to the terminal for a sure, simple and effective mechanical and electrical connection.

DESCRIPTION OF THE PREFERRED EMBODIMENT

Figure 1:
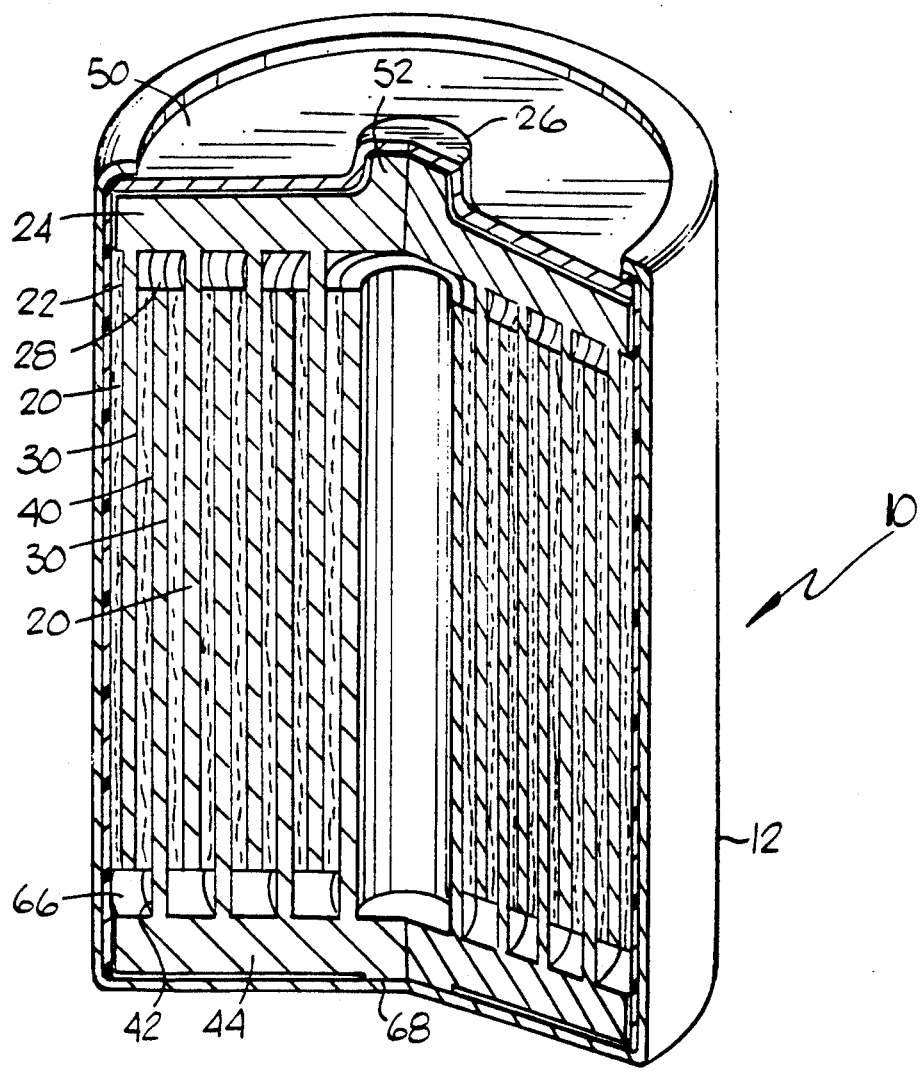
FIG. 1 shows a partial sectional, perspective view of a preferred embodiment of the present invention.

FIG. 1 shows a partial sectional view of a battery designed in accordance with a preferred embodiment of the present invention. The overall configuration of the battery 10 includes an outer case 12 which encloses a spirally wound set of plates and the separators. The layers of plates and separators are of the conventional configuration, comprising an anode plate 20, a separator 30, a cathode plate 40, a separator 30, another anode plate 20, and so on. The total number of plates and separators will depend on the thicknesses of the plates and separators and the width of the case cylinder. The number of plates and cylinders shown in the drawings are only for illustrational purposes and are not intended to depict the actual numbers.

The anode plate 20 and cathode plate 40 are preferably spirally wound from a single ribbon of anode plate and a single ribbon of cathode plate separated by a ribbon of separator plate 30. The anode plate 20 and cathode plate 40 are wound offset from one another so that the cylindrical spiral winding has the anode plate edges 22 protruding axially from one cylinder end and the cathode plate edges 42 protruding axially from the other cylinder end. The axially protruding anode plate edge 22 is attached to a disk-shaped anode end connector 24 which is in turn attached to the anode terminal 26. The protruding cathode plate edge is attached to a similar disk-shaped cathode end connector 44 which is in turn attached to the cathode terminal.

Figure 2:
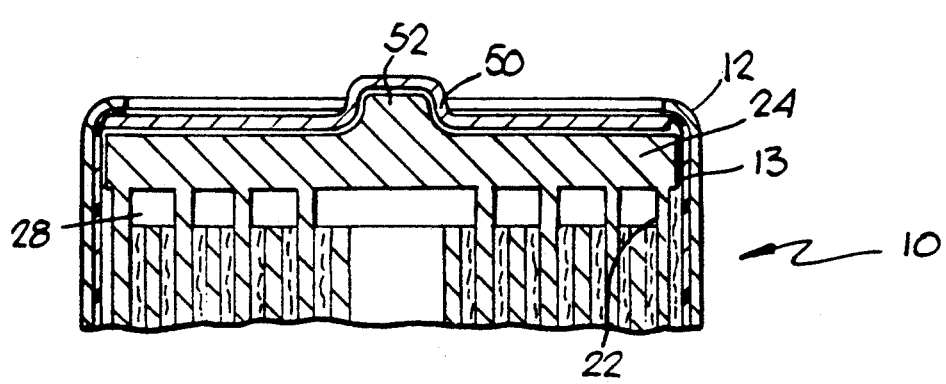
FIG. 2 shows a sectional view, taken along line 2—2 of FIG. 1.
Figure 3:
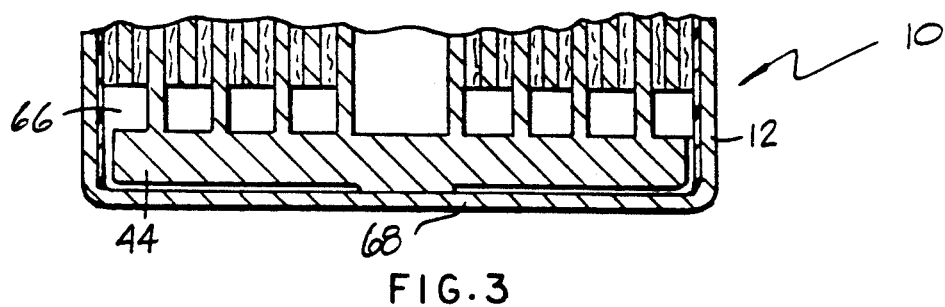
FIG. 3 shows a sectional view, taken along line 3—3 of FIG. 1.

The arrangement of the end connectors 24 and 44 in relation to the battery 10 is shown in greater detail in FIGS. 2 and 3. The anode end connector 24 has the anode plate protruding edge 22 connected to its bottom side. The anode plate 20 axially protrudes sufficiently from the spirally wound set of plates and separators such that the protruding anode plate edge 22 can attach to the anode end connector 24 and still leave an insulating space 28 between the spirally wound set of plates and separators and the anode end connector 24. The battery case 12 encloses the spirally wound set of plates and separators and is separated therefrom by a case insulator 13. The top of the anode end connector is covered with the anode terminal plate 50 and is attached thereto at the top of an axially extending anode end connector tab 52. The anode terminal plate 50 is electrically insulated from the battery case 12 by the case insulator 13.

The cathode end connector 44 has the cathode plate protruding edge 42 connected to its top side. As in the case of the anode plate 20, the cathode plate 40 axially protrudes sufficiently from the spirally wound set of plates and separators such that the protruding cathode plate edge 42 can attach to the cathode end connector 44 and still leave an insulating space 66 between the spirally wound set of plates and separators and the cathode end connector 44. The bottom of the cathode end connector 44 has an axially protruding tab 68 that attaches to the inner surface of the battery case 12 at the axial center of the cathode end.

In the preferred embodiment, the anode end connector 44 are attached to the anode plates 20 and cathode plates 40 as follows. The end connectors are cast in an open connector molding so that the side of the disk-shaped end connector that will receive the plates is exposed. While the metal is still molten, the spirally wound plate and separator assembly is dipped into the molten metal to a depth sufficient to submerge the axially protruding edges of one plate but not to such a depth that the non-protruding edge of the opposite polarity plate or the separator are submerged. The end connector is then allowed to harden, and the hardened end connector and integral spirally wound plate and separator assembly are then freed from the mold. The same process is used to attach the opposite end connector.

The temperature and heat content of the molten end connector when the plate edge is submerged is important. If the heat content is too high, the molten metal will melt off the submerged plate edge. If the heat content is too low, the molten metal will be unable to heat the plate sufficiently to form a strong electrical and mechanical connection.

Figure 4:
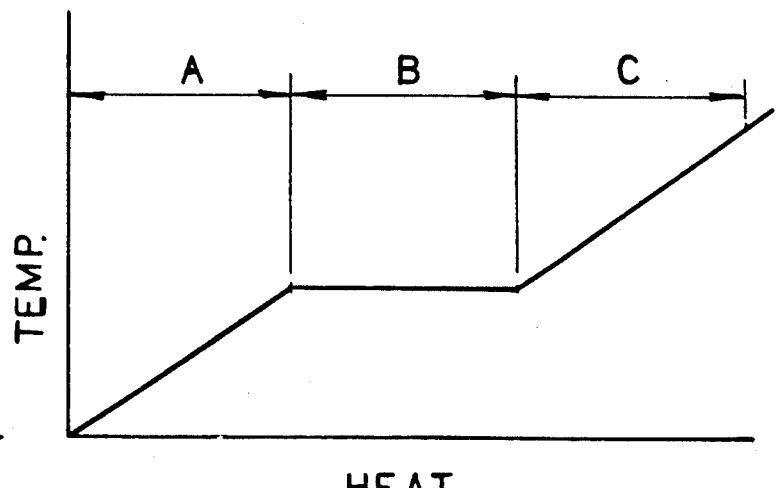
FIG. 4 shows a graph of temperature versus heat content for lead.

FIG. 4 shows a graph of temperature versus heat content at the melting point of lead. As the graph indicates, lead has a typical melting characteristic. The solid lead increases in temperature as heat is added to it, as shown in portion A of the graph. When it reaches the melting point, however, the temperature remains constant. Additional heat is utilized to melt the solid lead without increasing the temperature of the solid/liquid mixture. This plateau of constant temperature is shown as portion B of the graph. When the lead is fully melted, additional heat then begins to increase the temperature again, as shown in portion C of the graph.

The plate edge of the spirally wound plate and separator assembly should be submerged into the molten lead of the end connector casting when the molten lead is close to the boundary between the plateau of portion B and the incline of portion C of the graph of FIG. 4. It can be appreciated that if the molten lead is substantially to the left of the boundary, then the metal will be only partially melted when the plates are submerged into it. The partially molten metal will form a relatively poor electrical and mechanical connection with the plates. Making matters worse is that the plates themselves will normally be cooler than the molten metal and will thereby draw heat out of the molten metal, thereby further solidifying it and contributing to an even worse electrical and mechanical connection. On the other hand, if the molten material is substantially to the right of the boundary between portion B and portion C of the graph of FIG. 4, then the temperature is above the melting point and the metal is completely molten. If the plate edge is submerged in the molten material at this point, the molten material will have sufficient heat to not only raise the temperature of the plates to the melting point to form a good electrical and mechanical connection, it will have sufficient heat to melt off the edge of the plates.

The precise amount of heat desired in the molten lead in order to result in a good electrical and mechanical connection to the plates without melting the plates, will depend on the alloy characteristics of the plates and the end connector, the submersing temperature of the plates, the volume and configuration of both the end connectors and the plates, the thermodynamic characteristics of the mold, and other factors. Once the general principle and objective is known a person skilled in the art will be able to accomplish the process without undue experimentation.

The plates or the end connectors or both may be fabricated from a lead alloy containing roughly 0.5 to 0.6% tin. The use of lead/tin alloys in battery plates is generally known to produce a so-called tin effect whereby surface passivation is reduced so that charge and discharge characteristics are improved. Alternatively, the plates or end connectors or both may be coated with tin in order to reduce passivation without producing grain boundary corrosion sites in the conductor. Such a coating is preferably very thin—on the order of one micron—and may be applied by sputter coating or other techniques known in the art. Finally, the end connectors may be fabricated from a 60/40 alloy of lead/tin while the plates are still pure or substantially pure lead. This lowers the melting temperature and increases the process parameters of the end connectors.

Once the end connectors are cast onto the spirally wound plate and separator assembly, the entire unit can be placed into the battery case 12 lined with the battery case insulator 13. The anode terminal plate 50 is placed over the open end to close the case, and the case is crimped around the anode terminal plate 50 or otherwise connected thereto. It is important that the connection between the battery case and the anode terminal plate 50 include insulation between the two to prevent a short circuit of the battery. In the embodiment shown in FIGS. 1-3, the insulation is accomplished by the battery case insulator 13 extending upwardly and slightly over the top edge of the end connector between the anode end connection 24 and the crimped on battery case 12.

The axial tab 52 of the anode end connector 24 is then attached to the anode terminal plate 50 at the center indentation 51 of the anode terminal plate, by applying sufficient heat to the exterior surface of the indentation 50 to melt the axial tab onto the indentation interior surface. This heat can be applied with a spot welder or by normal heating means such as a soldering iron. The axial tab 68 of the cathode end connector 44 is attached to the interior surface of the battery case 12 in the same manner. Heat is applied to the center of the battery case cathode end sufficient to pass through the battery case and melt the axial tab 68 of the cathode and connector 44 onto the interior surface of the battery case 12.

A battery constructed in the manner described above provides excellent support for the plates, and has high resistance to vibrational damage. It also has an excellent electrical and mechanical connection from the plates through the end connectors and terminals, because of a continuous crystalline structure between the end connectors and the plates and the absence of any impedance-increasing reduction in cross sectional area for the electrical current path. These features are particularly important in a thin plate battery in which the plates are fragile, numerous and closely spaced, and in which relatively high current loads are possible.

Figure 5:
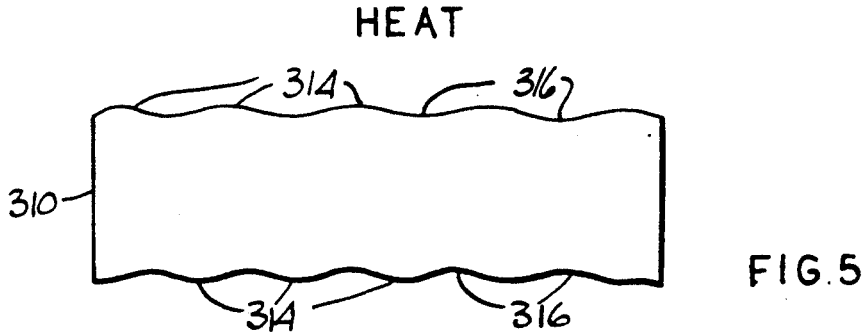
FIG. 5 shows a plan view of a plate used with another preferred embodiment of the present invention.

The plate used with another embodiment of the invention is shown in FIG. 5. In this embodiment, the plates 310 have an intermittent edge, as in a serrated or wavy edge, that includes protruding portions 314 and recessed portions 316. When such an edge is attached to the spaces through the plate at the point of attachment, these separations facilitate the immersion of the wound plate into the molten lead in the end connector mold by breaking the surface tension of the molten lead. Also, the resulting spaces allow liquid to flow between the plates, thereby improving the injection of acid or water into the battery.

Figure 6:
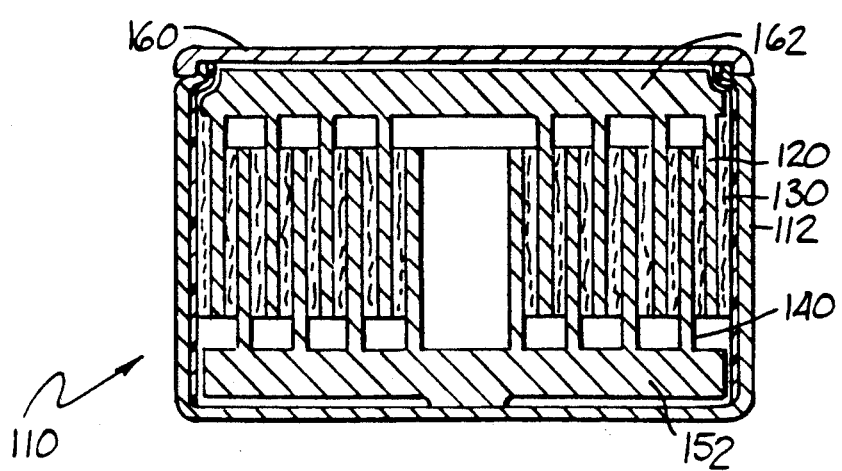
FIG. 6 shows another preferred embodiment of the present invention.

Yet another embodiment of the invention is shown in FIG. 6, in which the plates and separators are stacked rather than being spirally wound. This embodiment 110 includes a battery case 112, a set of individual anode plates 120, a set of separators 130 and a set of individual cathode plates 140. The anode plates 120 are electrically and mechanically connected to each other and to an anode terminal 160 by an anode end connector 162, and the cathode plates 140 are electrically and mechanically connected to each other and to a cathode end connector 152. As in the earlier-described embodiment, this embodiment includes a battery case insulator to insulate the battery case from the plates and separators and to insulate the battery case (which is common to the cathode terminal) from the anode terminal, an anode terminal plate 120, and an arrangement for closing the case (not shown). The end connectors 152 and 162 are attached to the plates utilizing the casting process described above, to achieve a mechanically strong and electrically good connection.

The embodiment shown in FIG. 6 can be made in virtually any configuration, such as a shape to fit into a power tool handle. The various configurations can be obtained either by using plates of abruptly or gradually varying edge profiles stacked together or by using plates of a single edge profile and then cutting the sandwiched layers after they are assembled.

It should be apparent to those skilled in the art that still other plate configurations are possible. Further, while the reference herein is to "plates", the plates need not be flat and need not be impermeable. The plates can be curved or of varying thickness and may also be porous or semiporous.

What is claimed is:

1. A battery, comprising a first electrical plate having a first electrical polarity, a first electrical battery terminal, and a first end connector connected to the first terminal and cast onto the first plate with no discontinuities between the first end connector and first plate for establishing electrical communication between the first plate and first terminal.

2. The battery of claim 1, wherein said first end connector is cast onto the first plate by casting the first end connector in a mold and immersing a portion of the first plate into the molten metal in the mold and allowing the molten metal with the immersed plate to cool.

3. The battery of claim 1, wherein the first plate is immersed into the molten metal in the mold when the temperature of the molten metal is approximately the melting point.

4. The battery of claim 1, wherein said first plate has an edge and said end connector is cast onto said edge.

5. A battery, comprising a first electrical plate having a first electrical polarity, and a first electrical battery terminal, wherein the first plate is spirally wound and has a spiral edge in substantially one edge plane, and a first end connector cast onto the first plate in said edge plane to establish electrical communication between the first plate and the first electrical battery terminal.

6. The battery of claim 5, wherein said edge plane is substantially perpendicular to the axis of the spiral winding.

7. The battery of claim 4, wherein the first plate edge has protruding portions to which the end connector is cast and recessed portions to which the end connector is not cast.

8. The battery of claim 1, wherein at least one of the plate and end connector is lead with approximately 0.2 to 1.0% tin.

9. The battery of claim 1, wherein the end connector is lead with approximately 30 to 50% tin.

10. The battery of claim 1, wherein the plate is lead with a tin coating.

11. The battery of claim 10, wherein the tin coating is approximately one micron thick.

12. A battery, comprising a first electrical plate having a first polarity, a first electrical battery terminal, a second electrical plate, having a polarity opposite the polarity of the first electrical plate, and a separator to separate the first and second plates, the first and second plates and separator being spirally wound with said first plate spiral edge extending axially out of a first end of said spiral winding, and a first end connector connected to the first electrical battery terminal and cast onto the first plate spiral edge without electrically communicating with the second plate.

13. The battery of claim 12, wherein the first plate and second plate and separator are spirally wound and the second plate has a spiral edge extending axially out of second end of said spiral winding, and further comprising a second electrical battery terminal and a second end connector connected to the first terminal and cast onto said second plate spiral edge without electrically communicating with the first plate.

14. The battery of claim 13, wherein the first and second plate spiral edges are each in substantially one edge plane that are parallel to one another and perpendicular to the axis of the spiral winding, so that the assembled combination of first plate, second plate, separator, first end connector and second end connector is substantially a cylinder with flat ends perpendicular to the cylinder case.

15. The battery of claim 14, wherein said second terminal is a battery casing enclosing the cylindrical battery and one end thereof.

16. The battery of claim 15, wherein said battery casing is welded to one of said end connectors.

17. The battery of claim 16, wherein said first terminal is a cover substantially covering the other end of said cylindrical battery and electrically insulated from the battery casing.

18. The battery of claim 17, wherein said terminal cover is welded to the other of said end connectors.

19. The battery of claim 18, wherein said first and second plates are no more than 0.005 inches thick.

20. The battery of claim 1, wherein said first plate is an anode plate, said first end connector is an anode end connector and said first terminal is an anode terminal, and further comprising a cathode plate and a separator separating the anode plane and cathode plate, a cathode terminal, and a cathode end connector connected to the cathode terminal and cast onto the cathode plate for establishing electrical communication between the cathode plate and cathode terminal.

21. The battery of claim 20, wherein the anode and cathode plates are substantially planar and wherein the edges of the plates define an edge profile.

22. The battery of claim 21, further comprising a plurality of anode plates in electrical communication with each other and onto which the anode end connector is cast and a plurality of cathode plates in electrical communication with each other and onto which the cathode end connector is cast.

23. The battery of claim 22, wherein the anode plates, cathode plates and separators are stacked so that anode plates are alternated with cathode plates and each pair of adjacent anode and cathode plates are separated by a separator.

24. The battery of claim 23, wherein each of said plurality of anode plates has an edge, said edges all lying substantially in a single plane, and the anode end connector is cast onto said edges.

25. The battery of claim 24, wherein the plurality of anode plate edges extend in a first direction beyond the stack of anode and cathode plates and separators, so that the anode end connector can be cast onto said anode edges without electrically communicating with the cathode plates.

26. The battery of claim 25, wherein each of said plurality of cathode plates has an edge, said edge all lying substantially in a single plane, and the cathode end connector is cast onto said edges.

27. The battery of claim 26, wherein the plurality of cathode plates extend in a second direction beyond the stack of anode and cathode plates and separators, so that the cathode end connector can be cast onto said cathode edges without electrically communicating with the anode plates.

28. The battery of claim 27, wherein said anode and cathode plates are less than 0.005 inches thick.

29. A method of making a battery, comprising arranging a set of anode and cathode plates divided by a separator, casting an end connector onto the plates with no discontinuities between the end connector and the plate by immersing an edge of said plates into molten metal that is at approximately the melting temperature of the metal whereby the plate edge is heated to approximately said temperature but is not melted to attach the plates to the end connector, and allowing the metal to solidify into an end connector with no discontinuities between the end connector and the plate.

30. The method of claim 29, wherein said edge has protruding portions that are immersed in the molten metal and recessed portions that are not immersed in the molten metal.

31. The method of claim 29, wherein at least one of the plates and end connectors are lead with approximately 0.2 to 1.0% tin.

32. The method of claim 29, wherein the end connector is lead with approximately 30 to 50% tin.

33. The method of claim 29, wherein the plate is coated with tin.

34. The method of claim 33, wherein said tin coating is approximately one micron thick.

35. The method of claim 29, wherein said plate edges are immersed when said metal is substantially all molten.

36. The method of claim 29, wherein the anode and cathode plates are less than 0.005 inches thick.

37. The method of claim 29, wherein said arranging of anode and cathode plates and separators includes spirally winding an anode plate and a cathode plate separated by a separator.

38. The method of claim 37, wherein said winding includes offsetting the anode plate in an axial direction from the separator so that a spiral edge of the anode plate extends axially beyond the separator for attachment to the anode end connector and offsetting the cathode plate in the opposite axial direction from the separator so that a spiral edge of the cathode plate extends in the opposite axial direction beyond the separator for attachment to the cathode end connector.

39. The method of claim 38, wherein said anode end connector is cast onto substantially the entire spiral edge of the anode plate, and said cathode end connector is cast onto substantially the entire spiral edge of the cathode plate.

40. The method of claim 29, wherein said arranging of anode and cathode plates and separators includes stacking a plurality of anode plates alternately with a plurality of cathode plates, the anode and cathode plates being separated by the separators.

41. The method of claim 40, wherein said anode plates are stacked offset from the separator so that a set of anode plate edges extends in a first direction beyond the separator for attachment to the anode end connector, and said cathode plates are stacked offset from the separator so that a set of cathode plate edges extends in a second direction different from the first direction beyond the separator for attachment to the cathode end connector.

* * * * *